(12) United States Patent
Shen et al.

(10) Patent No.: US 11,086,981 B2
(45) Date of Patent: Aug. 10, 2021

(54) METHOD FOR REALIZING THE CAPTCHA WITH 3D MODELS AND DEVICE THEREOF

(71) Applicant: Hangzhou Duoyan Network Technology Co., Ltd, Hangzhou (CN)

(72) Inventors: Jianguo Shen, Hangzhou (CN); Qiuer Xu, Hangzhou (CN); Nan Yuan, Hangzhou (CN)

(73) Assignee: HANGZHOU DUOYAN NETWORK TECHNOLOGY CO., LTD, Hangzhou (CN)

( * ) Notice: Subject to any disclaimer, the term of this patent is extended or adjusted under 35 U.S.C. 154(b) by 324 days.

(21) Appl. No.: 16/326,682

(22) PCT Filed: Jul. 26, 2017

(86) PCT No.: PCT/CN2017/094471
§ 371 (c)(1),
(2) Date: Feb. 19, 2019

(87) PCT Pub. No.: WO2018/032947
PCT Pub. Date: Feb. 22, 2018

(65) Prior Publication Data
US 2019/0188371 A1   Jun. 20, 2019

(30) Foreign Application Priority Data

Aug. 19, 2016 (CN) .......................... 201610697070.6

(51) Int. Cl.
*G06F 21/36* (2013.01)
*G06F 3/0484* (2013.01)
*G06T 19/20* (2011.01)

(52) U.S. Cl.
CPC .......... *G06F 21/36* (2013.01); *G06F 3/04845* (2013.01); *G06T 19/20* (2013.01);
(Continued)

(58) Field of Classification Search
CPC ..... G06F 21/36; G06F 3/04845; G06T 19/20; G06T 2219/2016
(Continued)

(56) References Cited

U.S. PATENT DOCUMENTS 8,019,127 B2 * 9/2011 Misra ...................... G06F 21/36
382/115
8,483,518 B2 * 7/2013 Zhu ........................ G06F 16/583
382/305
(Continued)

*Primary Examiner* — David T Welch
(74) *Attorney, Agent, or Firm* — Getech Law LLC; Jun Ye

(57) ABSTRACT

Methods for realizing the CAPTCHA with 3D models and device thereof comprises following steps: (1) randomly selecting a 3D model from a model repository as an original model; generating two sets of random transformations; (2) applying the target transformations to the original model to generate a target model; generating a target image from rendering the target model; (3) applying the initial transformations to the original model to generate an operating model; displaying the operating model and the target image in two regions in client; (4) changing the property of the operating model through user interactive operation until the state of the operating model is consistent with the target image; generating a final transformations from the initial transformations by means of user interactive operation; (5) comparing the target transformations with the final transformations. It leverages the advantage of perception of 3D space in human beings. So it is easy and rapid to distinguish the computers from humans, and the possibility of cracking by image recognition technology and AI technology is avoided or greatly reduced.

9 Claims, 7 Drawing Sheets

(52) U.S. Cl.
CPC ............ *G06F 2221/2133* (2013.01); *G06T 2219/2016* (2013.01)

(58) Field of Classification Search
USPC ........................................... 345/648
See application file for complete search history.

(56) References Cited

U.S. PATENT DOCUMENTS

| | | | | |
|---|---|---|---|---|
| 8,607,331 B2* | 12/2013 | Sun | ............ | G06F 21/36 726/19 |
| 8,621,396 B1* | 12/2013 | Gossweiler, III | ....... | G06F 21/36 715/863 |
| 8,631,467 B2* | 1/2014 | D'Urso | ............ | H04L 63/08 726/4 |
| 8,713,703 B2* | 4/2014 | Fisk | ............ | G06F 21/36 726/28 |
| 8,739,276 B2* | 5/2014 | Hulten | ............ | G06F 9/44 726/17 |
| 8,990,959 B2* | 3/2015 | Zhu | ............ | G06F 21/36 726/29 |
| 9,258,123 B2* | 2/2016 | Griffin | ............ | G06F 21/36 |
| 9,471,767 B2* | 10/2016 | Akula | ............ | G06K 9/00429 |
| 9,633,193 B2* | 4/2017 | Wang | ............ | G06F 16/9535 |
| 9,665,701 B2* | 5/2017 | Kruger | ............ | G06F 21/36 |
| 9,667,612 B2* | 5/2017 | Okada | ............ | H04L 63/08 |
| 9,710,637 B2* | 7/2017 | Kalra | ............ | G06F 21/6218 |
| 10,157,328 B2* | 12/2018 | Barreau | ............ | H04W 12/06 |
| 10,204,216 B2* | 2/2019 | Nejati | ............ | G06F 21/36 |
| 10,284,561 B2* | 5/2019 | Kwon | ............ | H04L 63/10 |
| 10,354,060 B2* | 7/2019 | Kaladgi | ............ | H04L 63/1441 |
| 10,417,399 B2* | 9/2019 | Wajs | ............ | G06F 21/16 |
| 10,439,818 B2* | 10/2019 | Luo | ............ | H04L 9/3226 |
| 10,496,809 B1* | 12/2019 | Pham | ............ | G06N 3/084 |
| 2008/0244700 A1* | 10/2008 | Osborn | ............ | G06F 21/36 726/2 |
| 2011/0029781 A1* | 2/2011 | Clark | ............ | G06F 21/31 713/182 |
| 2011/0208716 A1* | 8/2011 | Liu | ............ | G06F 21/36 707/710 |
| 2012/0086785 A1* | 4/2012 | Valin | ............ | G06Q 30/0601 348/47 |
| 2013/0104217 A1* | 4/2013 | Kruger | ............ | G06F 21/31 726/7 |
| 2014/0317744 A1* | 10/2014 | Turgeman | ............ | H04W 12/06 726/23 |
| 2016/0055329 A1* | 2/2016 | Akula | ............ | H04L 63/083 726/7 |

* cited by examiner

METHOD FOR REALIZING THE CAPTCHA WITH 3D MODELS AND DEVICE THEREOF

TECHNICAL FIELD

The present invention relates to the CAPTCHA, and more particularly relates to method and device for realizing the CAPTCHA with 3D models.

BACKGROUND

CAPTCHA as a human-machine automatic distinguishing technology has become one of the most widely used security technologies in the internet field. It can avoid or reduce general security risks, for example, batch registration, automatic post, brute force, malicious ranking, and SMS bomb, etc. The CAPTCHA can be classified into three categories:

(1) Image CAPTCHA: it can be divided into two categories according to the content of the image, one is character image CAPTCHA and the other is non-character image CAPTCHA. The character image CAPTCHA is a one of the most common CAPTCHA. It uses random characters as the image content. The advantages of this kind of CAPTCHA are simple and intuitive, and easy to implement. But the cracking rate of the character image CAPTCHA is getting higher and higher with the development of image recognition technology and AI technology. As published in China patent publication No CN104283682A, it increases the difficulty of cracking by adding interference elements, but it is still hard to balance security with user experience. Therefore, the character image CAPTCHA is replaced by other kinds of CAPTCHA gradually. Non-character image CAPTCHA uses existing images as the content. It is difficult to crack with image recognition technologies because of a wide variety of the content in image. However, it also has some drawbacks, for example: manual filtering and processing are required when selecting images, and the cost is high; it is easy to crack through exhaustive traversal because of the number of images is limited. Although security can be enhanced by constantly updating the image library, it also increases labor costs.

(2) Voice CAPTCHA: The mechanism of the voice CAPTCHA is similar to the image CAPTCHA, only replacing the image with the voice as information carrier. It can also be cracked by speech recognition or exhaustive methods.

(3) Behavior CAPTCHA: The behavior CAPTCHA is a new type of CAPTCHA. According to the complexity, it can be divided into simple behavior CAPTCHA and complex behavior CAPTCHA. Simple behavior CAPTCHA is mainly verified by clicking and dragging, e.g. Verification is accomplished by collecting mouse trajectory information when moving the slider or clicking checkboxes. It is easy to crack by program simulation, so the security is low. Complex behavior CAPTCHA is verified by analyzing a large number of behavior characteristics that generates when users visit website. It has better security, but is more difficult to implement because it needs to establish a complete verification model based on its own business characteristics.

SUMMARY OF THE INVENTION

The technical problem to be solved by the present invention is to provide a method for realizing the CAPTCHA with 3D models and device thereof which are simple to implement and can improve the anti-cracking ability of CAPTCHA while ensuring the user experience without increasing the labor costs.

The technical solution adopted by the present invention to solve the above technical problem is to provide a method for realizing the CAPTCHA with 3D models which comprises following steps:

1) randomly selecting a 3D model from a model repository as an original model;
    generating two sets of random transformations, one is a set of initial transformations, and the other is a set of target transformations;
2) applying the target transformations to the original model to generate a target model;
    generating a target image from rendering the target model;
3) applying the initial transformations to the original model to generate an operating model;
    displaying the operating model for user operation in one region of a client, and displaying the target image in another region of the client;
4) changing the property of the operating model through user interactive operation until the state of the operating model is consistent with the target image; generating a final transformations from the initial transformations by means of user interactive operation;
5) comparing the target transformations with the final transformations, if the differences between them are within a predefined target difference threshold value, return the verification success, otherwise, return the verification failure.

In order to facilitate the rotation, the model repository comprises various 3D models, and there is a preprocessing step before the step 1). The preprocessing step is translating the centric point of all the 3D models to the origin of the world coordinate system and saving them in the model repository.

Preferably, the set of initial transformations and the set of target transformations both contain at least one transformation, both sets of the transformations have the same number of transformations, and each transformations in one set is corresponds to one in the other set. The transformation can be rotation transformation, scale transformation, translation transformation, material transformation or color transformation.

To facilitate the user operation through the slider, the step for generating two sets of transformations in the step 1) comprises following sub-steps: 1.1) generating a set of initial transformations and a set of initial target transformations; 1.2) generating a random number; 1.3) generating the target transformations from the initial transformations, the initial target transformations and the random number.

In order to prevent the operating model from being too similar to the target image, after generating the initial transformations and the target transformations in step 1), judging the difference between them, if the difference between them is within a predefined initial threshold value, generating another pair.

In order to prevent the operating model from being too similar to the target image, after generating the initial transformations and the initial target transformations in step 1.1), judging the difference between them, if the difference between them is within a predefined intermediate threshold value, generating another pair.

A device to implement the above method for realizing the CAPTCHA with 3D models, comprising a transformation generator module that generates the set of initial transformations and the set of target transformations;

A rendering module that generates the target model from an original model by applying the target transformations, and then renders the target model to generate the target image;

An interactive rendering module that generates the operating model from the original model by applying the initial transformations, displays the target image and the operating model in a client, implements the interface between a user and a computer and calculates the final transformations according to user operation;

A transformations comparison module that compares the final transformations with the target transformations, and if the differences between them are within a predefined target threshold value, returns the verification success, otherwise, returns the verification failure.

Preferably, there is a model repository that stores the 3D models and a model initialization module that preprocesses all the 3D models in the model repository.

Preferably, the transformations generator module is comprises a random number generator module that generates a random number, and a transformations interpolation module that generates the target transformations.

In order to prevent the CAPTCHA be cracked from intercepting the target transformations in the client, the transformation generator module, the model rendering module and the transformations comparison module are in a server; the interactive rendering module is in a client.

Compared with the prior art, the invention has the advantages that leverages the advantage of perception of 3D space in human beings. So it is easy and rapid to distinguish the computers from humans, and the possibility of cracking by image recognition technology and AI technology is avoided or greatly reduced. The random transformations are used to generate different initial state of the 3D models and target images, and thereby the automatic generation and updating of the CAPTCHA are realized. Therefore the cracking possibility by the computer through the exhaustive traversal method is avoided or greatly reduced, and the costs of manual filtering is effectively reduced; the CAPTCHA is completed by sliding operation instead of keyboard operation, and therefore the possibility of user misoperation is reduced and the interaction efficiency and user experience are improved.

BRIEF DESCRIPTION OF THE DRAWINGS

FIG. 2a is a schematic view of the initial page, and FIG. 2b is a schematic view of rotating the operating model to the correct state through sliding operation.

FIG. 5a is a schematic view of the initial page, and FIG. 5b is a schematic view of rotating the operating model to the correct state through moving the slider.

DETAILED DESCRIPTION OF EMBODIMENTS

Figure 1:
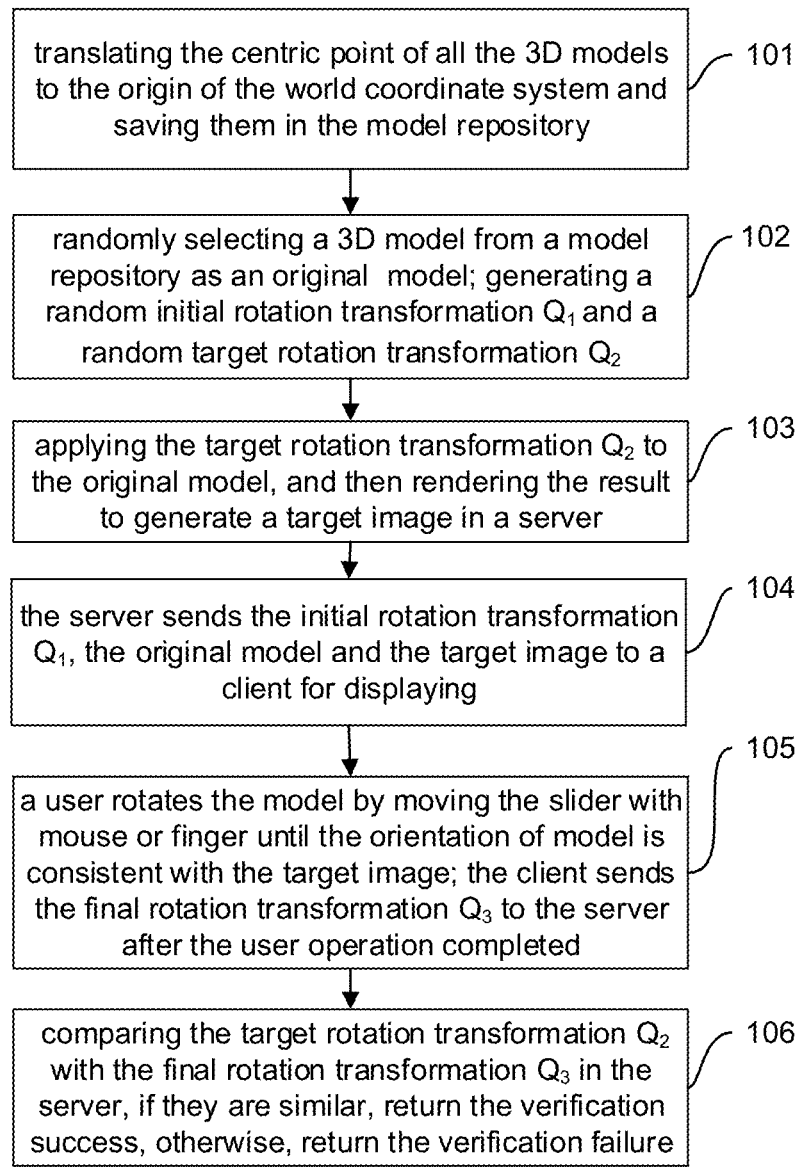
FIG. 1 is a working flow diagram of a method for realizing the CAPTCHA with 3D models according to a first embodiment of the present invention.

The present invention will be further described in detail with reference to the embodiments accompanying drawings.

As show in FIG. 1, FIG. 2a, FIG. 2b and FIG. 3, there are working flow diagrams of a method for realizing the CAPTCHA with 3D models, and display schematic view of the device thereof according to the first embodiment of the present invention.

The method for realizing the CAPTCHA with 3D models of this embodiment needs to form a model repository that stores various 3D models with different shape in advance. The steps of this method for realizing the CAPTCHA with 3D models are listed as following:

Step 101, preprocesses all the 3D models in the model repository: translates the centric point of the 3D models to the origin of the world coordinate system in order to rotate the model around its centric point easily when user operates. Save the translated 3D models to the model repository.

Step 102, after a server receives the client's request for a CAPTCHA, randomly selects a 3D model as an original model and generates two different sets of random transformations: initial transformations and target transformations. In this embodiment, the transformations are two rotation transformations: $Q_1$ and $Q_2$, where $Q_1$ is an initial rotation transformation and $Q_2$ is a target rotation transformation. The rotation transformations can be represented by three-order orthogonal matrix, unit quaternion or Euler angle. The unit quaternion is used in this embodiment, so $Q_1$ is the initial rotation quaternion and $Q_2$ is the target rotation quaternion. In order to avoid the initial rotation transformation and the target rotation transformation are too similar, $Q_1$ and $Q_2$ must satisfy the following condition, and otherwise the server should generate another pair:

$$\text{FAbs}(\text{Dot}(Q_1, Q_2) - 1.0) > \varepsilon_1$$

Where $\varepsilon_1$ is the predefined initial difference threshold value of the initial rotation transformation $Q_1$ and the target rotation transformation $Q_2$ and the value range is (0, 1). The initial difference threshold value $\varepsilon_1$ can be set according to actual needs. The larger the value is, the more significant the difference between the initial state and the target state is, and the more difficult user operation is. The value is set to 0.1 in this embodiment. FAbs is an absolute value function. Dot is a dot product function of two quaternions. Those skilled in the art should know that the transformations in the initial transformation and the target transformation are variables to change properties of the 3D model, like changing the orientation, the size, the position, the material, the color and so on. Correspondingly, the transformations are rotation transformation, scale transformation, translation transformation, material transformation, color transformation and so on.

Step 103, the server applies the target rotation transformation $Q_2$ to the original model to generate a target model and renders it to a target image. The view frustum and the viewport should be properly set to ensure that the entire target model is in the image area and in the center of the image when rendering. The size of the target image is set to 150 px*100 px, where px stands for pixel.

Figure 2A:
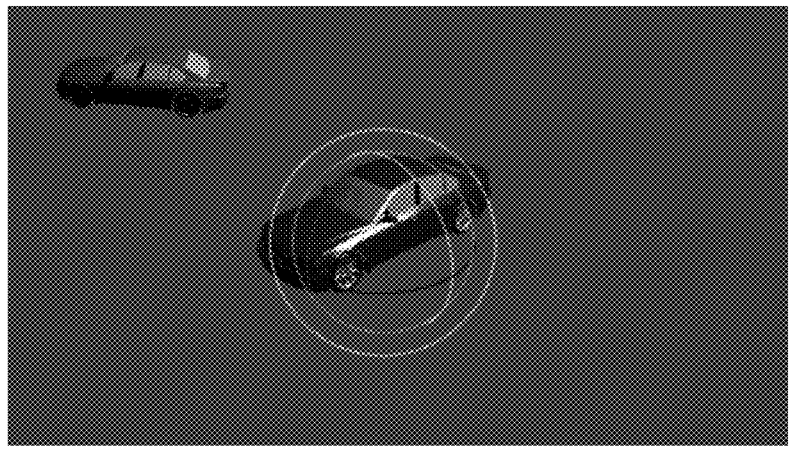
FIG. 2a, 2b are display schematic views of the display regions in the client according to the first embodiment of the present invention, where

Step 104, the server sends the initial rotation transformation $Q_1$, the original model and the target image to the client. After the client receives the data, it displays in two regions, one displays the operating model which is generated by applying the initial rotation transformation Q1 to the original model using 3D rendering technology, and the other region displays the target image, as seen in FIG. 2a.

Step 105, the user rotates the operating model by sliding with a mouse or finger. That is the operating model is operated in one region until the state of the operating model is consistent with the state of the target model which displays in the target image. A final rotation transformation $Q_3$ is generated from the initial rotation transformation $Q_1$ by the user interactive operation.

The rotation is implemented by a trackball method that is commonly used. That is, first maps the 2D coordinates generated by sliding on screen to the surface of the sphere to generate 3D coordinates; sets the 3D coordinates of the starting point of a certain sliding to be $P_1$, the 3D coordinates of the end point to be $P_2$, the origin point of the coordinates to be P0, vector $V_1=P_1-P_0$, vector $V_2=P_2-P_0$, then the generated rotation transformation $Q_t$ is:

$$Q_t=[\sin(\theta/2)*(\text{Norm}(\text{Cross}(V_1,V_2)), \cos(\theta/2)];$$

Where θ represents the angle between $V_1$ and $V_2$; Cross is the cross product of two vectors; Norm is the normalization function of vector. Real-time rotation can be implemented by applying $Q_t$ during rendering.

Multiple $Q_t$s are generated by the user's continuous sliding operation. The quaternion multiplication is the combination of rotations, and the result of $Q_{t2}*Q_{t1}$ means that the rotation $Q_{t1}$ is applied first, and then the rotation $Q_{t2}$ is applied. So the final rotation transformation $Q_3$ in client is calculated as $Q_3=Q_{tn}*Q_{tn-1}* \ldots *Q_{t2}*Q_{t1}*Q_1$, where * is the production of the quaternion, and to represents the nth completed rotation operation. $Q_{tn}$ is the middle rotation transformation generated by each rotation operation. n is the times that user operated, and is natural number.

Figure 2B:
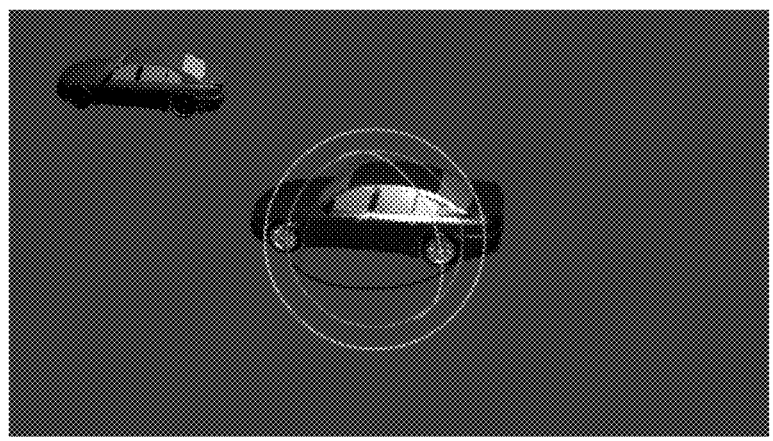

As show in the FIG. 2b, user rotates the 3D model by rotating operation until the orientation of operating model is consistent with the target image. The client sends the final rotation transformation $Q_3$ to the server after user operation.

Step 106, after the server receives the feedback data from the client, judge whether the difference of the final rotation transformation $Q_3$ and the target rotation transformation $Q_2$ is within a predefined target difference threshold value. That is, whether the following formula is true:

$$\text{FAbs}(\text{Dot}(Q_2,Q_3)-1.0)<\varepsilon_2$$

Where $\varepsilon_2$ is the predefined target difference threshold value between the final rotation transformation and the target rotation transformation, and the value range is (0, 1). The target difference threshold value $\varepsilon_2$ can be set according to actual needs, the smaller the value is, the smaller the difference between the final orientation and the target orientation is, and the more difficult the passing of the verification is. The value is set to 0.1 in this embodiment. FAbs is an absolute value function, and Dot is a dot product function of two quaternions. If the equation is true, return the verification success, otherwise return the verification failure.

Figure 3:
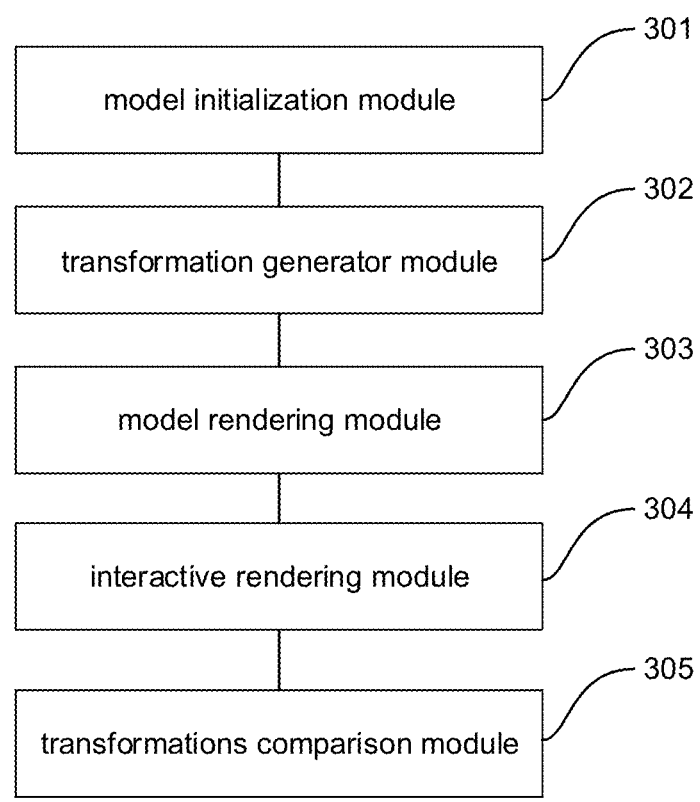
FIG. 3 is a schematic view of a device for realizing the CAPTCHA with 3D models according to the first embodiment of the present invention.

FIG. 3 is a schematic view of a device for realizing CAPTCHA with 3D models according to the first embodiment of the present invention, comprises the following modules:

A model initialization module 301, is used to preprocess all the 3D models in the model repository. It translates the centric point of 3D models to the origin of the world coordinate system, in order to rotate the model around its centric point easily when user operates. Then save the translated 3D models to the model repository.

A transformation generator module 302, is used to generate the random transformation for changing the state of 3D models, including the initial transformation and the target transformation. In this embodiment, they are random rotation transformations which are used to change the orientation of the 3D model, including the initial rotation transformation $Q_1$ and target rotation transformation $Q_2$, which are represented by unit quaternion.

A rendering module 303, is used to generate the target model from the original model by applying the target transformations and render the target model to generate the target image. In this embodiment, the target model is generated from the original model by applying the target rotation transformation $Q_2$, and then the target model is rendered to generate the target image.

An interactive rendering module 304, is used to display the received operating model, the target image in the client, and the operating model which is generated from the original model by applying the initial transformations. Then various methods are used to implement human-computer interaction functions, and the final transformation generated by user operations is calculated. The final transformation is sent back to the server. In this embodiment, the rotation operation is implemented by track ball method. The final rotation transformation $Q_3$ which is generated from cumulatively recording transformations produced by sliding with mouse or finger is sent back to the server.

A transformations comparison module 305, is used to compare the final transformation sent by the client with the target transformation. If they are similar, return the verification success, otherwise, return the verification failure. In this embodiment, compare the final rotation transformation $Q_3$ with the target rotation transformation $Q_2$.

The model initialization module 301, the transformation generator module 302, the rendering module 303 and the transformations comparison module 305 are in the server. The interactive rendering module 304 is in the client. Those skilled in the art should know that the transformation generator module 302, the rendering module 303 and the transformations comparison module 305 are preferably in the server, only the interactive rendering module 304 is in the client. It can prevent the client from intercepting the information of the target transformations for cracking.

The above-mentioned rendering module 303 and the transformations comparison module 305 can also be in the client. The transformations can be generated in the server and sent to the client, and then the target image and the operating model are generated in the client. The result of comparison the final transformations with the target transformations is sent back to the server. Alternatively, the transformation generator module may also be in the client, or the server may be omitted as needed, that is, the location of the modules of this device may be arbitrarily set. In the above embodiments, in order to prevent the client from cracking the CAPTCHA by intercepting the target transformations, an additional encryption program is required.

Figure 4:
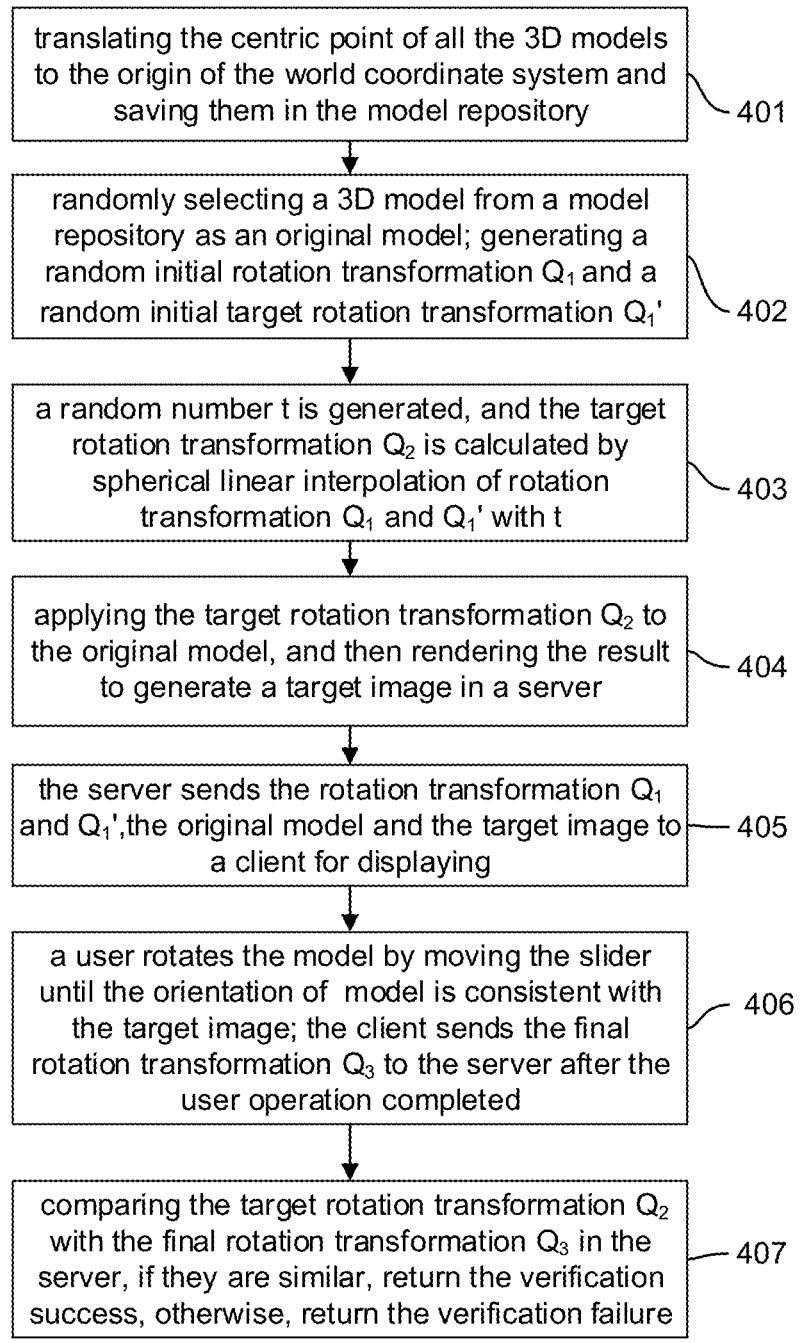
FIG. 4 is a working flow diagram of a method for realizing the CAPTCHA with 3D models according to a second embodiment of the present invention.

Referring to FIG. 4, is a flow view of the method for realizing CAPTCHA with 3D models according to the second embodiment of the present invention. This embodiment also needs to form a model repository that stores various 3D models with different shape in advance. The method of this embodiment includes the following steps:

Step 401, preprocesses all the 3D models in the model repository: translates the centric point of 3D models to the origin of the world coordinate system in order to rotate the model around its centric point easily when user operates. Save the translated 3D models to the model repository.

Step 402, after the server receives the client's request for a CAPTCHA, randomly selects one 3D model as the original model and generates two different random rotation transformations $Q_1$ and $Q_1'$, where $Q_1$ is the initial rotation transformation and is an initial target rotation transformation. The initial rotation transformation $Q_1$ and the initial target rotation transformation are represented by unit quaternion. In order to avoid the initial rotation transformation and the initial target rotation transformation are too similar, the random generated $Q_1$ and $Q_1'$ must satisfy the following condition, and otherwise the server should generate another pair:

$$FAbs(Dot(Q_1,Q_1')-1.0) > \varepsilon_3$$

Where $\varepsilon_3$ is the predefined intermediate difference threshold value of the initial rotation transformation and the initial target rotation transformation, and the value range is (0, 1). The intermediate difference threshold value $\varepsilon_3$ can be set according to actual needs. The larger the value is, the more significant the difference between the initial state and the initial target state is, and the more difficult user operation is. The value is set to 0.1 in this embodiment. FAbs is an absolute value function. Dot is a dot product function of two quaternions.

Step 403, generates a random number t in the range (0, 1), and calculates the target rotation $Q_2$ by the following formula: $Q_2=Slerp(Q_1, Q_1', t)$, which Slerp is the spherical linear interpolation function of two quaternions, and the return value is a unit quaternion.

Step 404, the rendering module applies the target rotation transformation $Q_2$ to the original model to generate the target model, and renders it to a target image. The view frustum and the viewport should be properly set to ensure that the entire target model is in the image area and in the center of the image when rendering. The size of the target image is set to 150 px*100 px, where px stands for pixel.

Figure 5A:
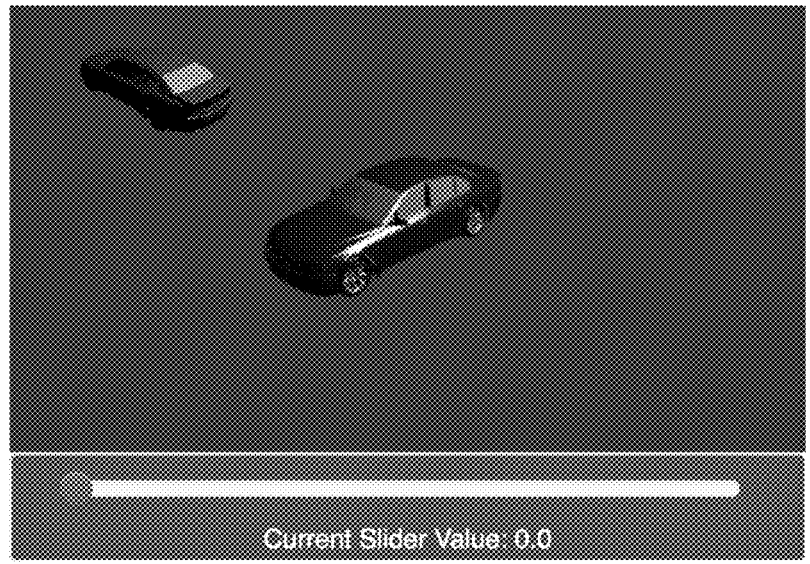
FIG. 5a, 5b are display schematic views of the display regions in the client according to the second embodiment of the present invention, where

Step 405, server sends the original model, the initial rotation transformation the initial target rotation transformation $Q_1'$ and the target image to the client. The client receives the data, then displays the operating model which is generated by applying the initial rotation transformation Q1 to the original model in one region using 3D rendering technology, and displays the target image in the other region, as show in FIG. 5a.

Step 406, the user rotates the operating model by moving the slider with a mouse or finger in the client. The length of the slider is 200 px, where px stands for pixel. The range value of the slider is [0.0, 1.0]. That is, one pixel is moved each time, and the value of the slider increases or decreases by 0.005. So the final rotation $Q_3$ generated by moving the slider is:

$Q_3=Slerp(Q_1, Q_1', s)$, where s is the value of the slider, and Slerp is the spherical linear interpolation function of two quaternions. The client renders the operating model using the final rotation $Q_3$ to implement its rotation. That is, as the slider moves, the operating model rotates in 3D space.

Figure 5B:
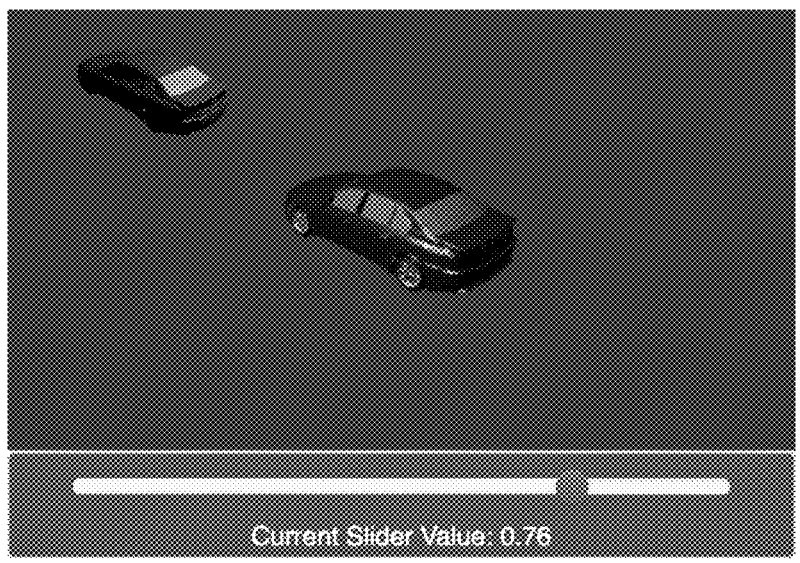

As show in FIG. 5b, user rotates the 3D model by moving the slider until the orientation of the 3D model is consistent with the target image. The client sends the final rotation transformation $Q_3$ to the server after the user operation completed.

Step 407, the server calculate whether the following formula holds, after receives the feedback data from the client:

$$FAbs(Dot(Q_2,Q_3)-1.0) < \varepsilon_2$$

Where $\varepsilon_2$ is a predefined target difference threshold value between the final rotation transformation and the target rotation transformation, and the value range is (0, 1). $\varepsilon_2$ can be set according to actual needs. The smaller the value is, the smaller the difference between the final orientation and the target orientation is, and the more difficult the passing of the verification is. The value is set to 0.1 in this embodiment. FAbs is an absolute value function. Dot is the dot product function of two quaternions. If the formula is true, return the verification success, otherwise return the verification failure.

In contrast with the first embodiment, in this embodiment employs a slider to rotate the model and so it needs an intermediate random number t to control the transformation. So this shows that the transformation can be represented by many ways, and can be represented and judged by various algorithms.

Figure 6:
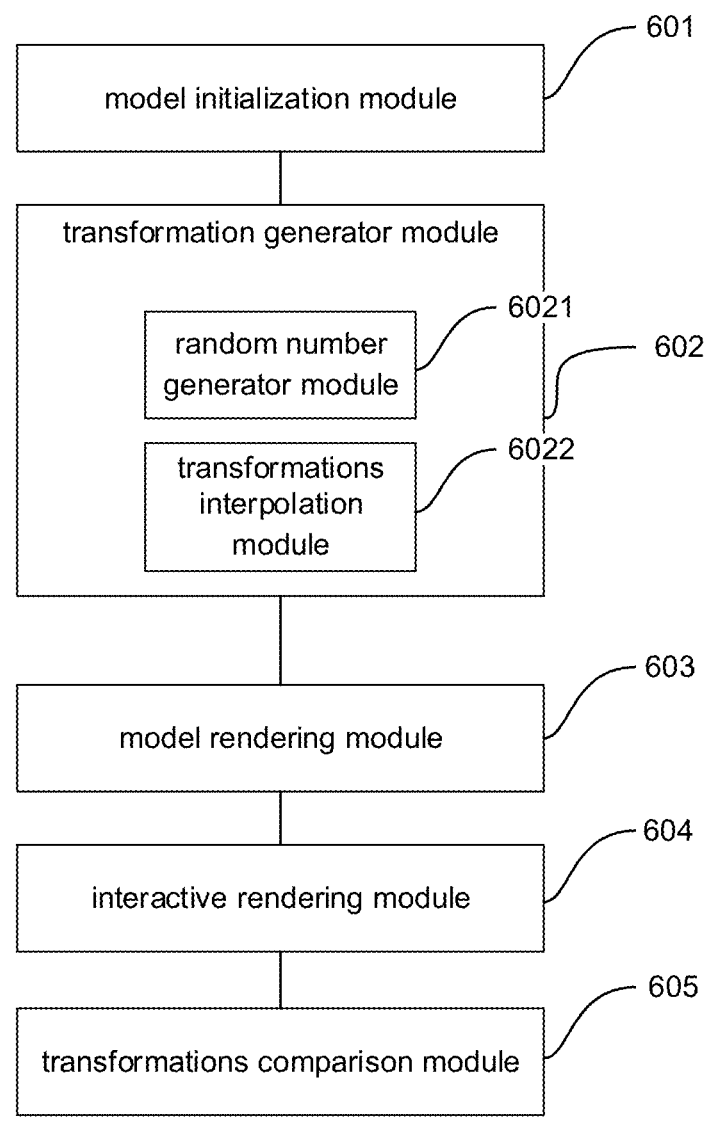
FIG. 6 is a schematic view of a device for realizing the CAPTCHA with 3D models according to the second embodiment of the present invention.

The FIG. 6 is a schematic show of a device for realizing the CAPTCHA with 3D models according to the second embodiment of the present invention. It comprises:

A model initialization module 601 is used to preprocess all the 3D models in the model repository. It translates the centric point of 3D model to the origin of the world coordinate system in order to rotate the model around its centric point easily when user operates. Save the translated 3D models to the model repository.

A transformation generator module 602 is used to generate the random rotation transformation for changing the orientation and the rotation transformation is represented by unit quaternion. In this embodiment, it is used to generate the initial rotation transformation $Q_1$ and the initial target rotation transformation $Q_1'$.

The transformations generator module 602 comprises a random number generator module 6021 and a transformations interpolation module 6022. The random number generator module 6021 is used to generate a random number t in the range (0, 1). The transformations interpolation module 6022 is used to generate the target rotation transformation $Q_2$ by calculating the spherical linear interpolation of two rotations.

A rendering module 603 is used to generate the target model from the original model by applying the target transformations and render the target model to generate the target image. In this embodiment, the target model is generated from the original model by applying the target rotation transformation $Q_2$, and then render the target model to generate the target image.

An interactive rendering module 604 is used to display the operating model which is generated from the original model by applying the received initial transformations and the target image in the client. The model rotation is realized by the new rotation which is generated by interpolation of two received rotation transformations with the value produced by the slider. The final rotation transformation is sent to the server when the operation is completed. That is, the final rotation transformation $Q_3$ is sent to the server.

A transformations comparison module 605 is used to compare the final transformation sent by the client with the target transformation generated randomly. If they are similar, return the verification success, otherwise, return the verification failure. In this embodiment, that is, judge the difference of the final rotation transformation $Q_3$ and the target rotation transformation $Q_2$.

The above-mentioned model initialization module 601, the transformation generator module 602, the rendering module 603 and the transformations comparison module 605 are in the server. The interactive rendering module 604 is in the client. It prevents the client from intercepting the information of the target transformation for cracking the CAPTCHA in bulk.

Optionally, the rendering module 603 and the transformations comparison module 605 can also be in the client. If the rendering module 603 is in the client, in the steps in this embodiment, the server only needs to send the generated random rotation $Q_1$ and $Q_1'$ and the original model to the client. The target image and the operating model are generated in the client. And the final transformations are compared with the target transformations in the client, the result is sent back to the server finally. Those skilled in the art can make corresponding adjustments as needed, and the transformation generator module 602 can also be in the client. In the above-mentioned embodiments, in order to prevent the client from cracking the CAPTCHA by intercepting the target transformations, an additional encryption program is required.

Figure 7:
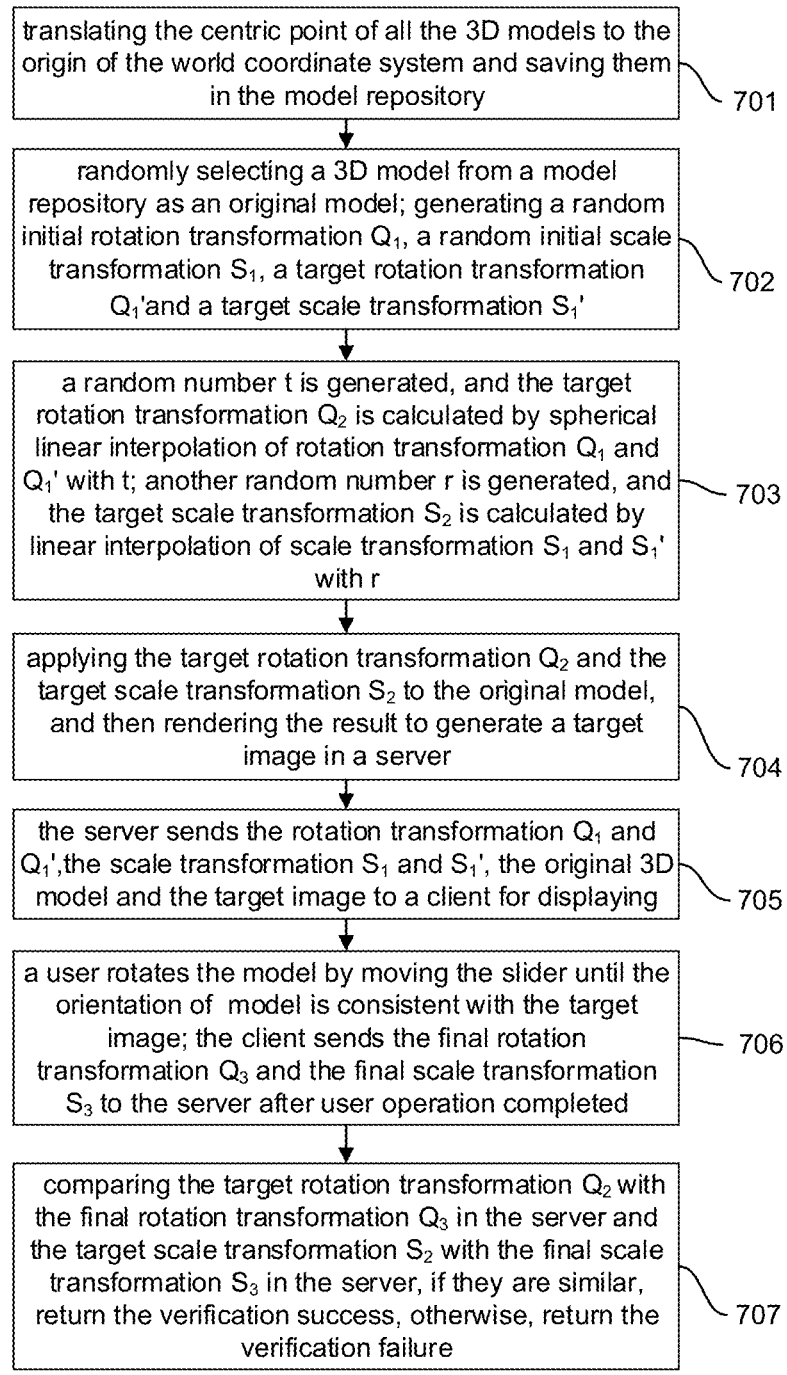
FIG. 7 is a working flow diagram of a method for realizing the CAPTCHA with 3D models according to a third embodiment of the present invention.

FIG. 7 is a working flow diagram of the method for realizing the CAPTCHA with 3D models according to the third embodiment of the present invention. Same as the first and second embodiments, this method also needs to form a model repository that stores various 3D models with different shape in advance. Specifically, comprises the following steps:

Step 701, preprocesses all the 3D models in the model repository. That is, translate the centric points of 3D models to the origin of the world coordinate system in order to rotate the model around its centric point easily when user operates. Save the translated 3D models to the model repository.

Step 702, after the server receives the client's request for a CAPTCHA, the server randomly selects one 3D model as an original model and generates two different sets of random transformations, one set of initial transformations and one set of initial target transformations. In this embodiment, one set of initial transformations includes an initial rotation transformation $Q_1$ and an initial scale transformation $S_1$. Another set of initial target transformations includes an initial target rotation transformation $Q_1'$ and an initial target scale transformation $S_1'$. The initial rotation transformation $Q_1$ and the initial target rotation transformation $Q_1'$ are represented by unit quaternion, and the initial scale transformation $S_1$ and the initial target scale transformation $S_1'$ are represented by real number.

In order to avoid two sets of transformations are too similar, the initial rotation transformation $Q_1$ and the initial target rotation transformation $Q_1'$, and the initial scale transformation $S_1$ and the initial target scale transformation $S_1'$ must satisfy the following condition, otherwise the server should generate another pair:

FAbs(Dot($Q_1, Q_1'$)−1.0)>$\varepsilon_3$ and ($S_1/S_1'$>$\lambda_1$ or $S_1'/S_1$>$\lambda_1$);

Where $\varepsilon_3$ is a predefined intermediate rotation difference threshold value of the initial rotation transformation and the initial target rotation transformation, and the value range is in (0, 1). The intermediate rotation difference threshold value $\varepsilon_3$ can be set according to actual needs. The larger the value $\varepsilon_3$ is, the more significant the difference between the initial state and the initial target state is, and the more difficult user operation is. The value is set to 0.1 in this embodiment. FAbs is an absolute value function. Dot is a dot product function of two quaternions. $\lambda_1$ is the predefined intermediate scale difference threshold value of the initial scale transformation and the initial target scale transformation. $\lambda_1$ can be set according to actual needs. The larger the value is, the more significant the difference between the initial state and the initial target state is, and the more difficult user operation is. The value is set to 1.1 in this embodiment. In order to avoid scaling too large or too small to be recognized by the user, the value range of $S_1$ and $S_1'$ can be (0.5, 2.0).

Step 703, a random number t is generated in the range (0, 1), and the target rotation transformation $Q_2$ is calculated by the following formula: $Q_2$=Slerp($Q_1, Q_1'$, t), which Slerp is the spherical linear interpolation function of two quaternions, and the return value is a unit quaternion.

Another random number r is generated in the range (0, 1), and the target scale transformation $S_2$ is calculated by the following formula: $S_2$=Lerp($S_1, S_1'$, r), where Lerp is the linear interpolation function of two numbers, and the return value is the interpolated number.

Step 704, a rendering module applies the target rotation transformation $Q_2$ and the target scale transformation $S_2$ to the original model to generate a target model, and renders the target model to a target image. The view frustum and the viewport should be properly set to ensure that the entire model is in the image area and in the center of the image when rendering. Meanwhile ensure the size of the target image is the same as the size of model display area in the client, so that the user can scale the model with reference to the target image.

Step 705, server sends the original model, the initial rotation transformation $Q_1$, the initial target rotation transformation $Q_1'$, the initial scale transformation $S_1$, the initial target scale transformation $S_1'$ and the target image to the client. After the client receives the data, it displays the operating model which is generated by applying the initial rotation transformation $Q_1$ and the initial scale transformation $S_1$ to the original model using 3D rendering technology in one region, and displays the target image in the other region. Two regions keep in the same size in this embodiment.

Step 706, there are two sliders in the client. They are used to control the rotation and the scale respectively. The user moves the sliders with a mouse or fingers. The length of the slider is 200 px, where px stands for pixel, and correspondingly, the range value of the slider is [0.0, 1.0]. That is, moves one pixel each time, the value increases or decreases by 0.005. So the final rotation transformation $Q_3$ and the final scale transformation $S_3$ generated by moving the slider are:

$Q_3$=Slerp($Q_1, Q_1'$, s), where s is the value of the slider, and Slerp is the spherical linear interpolation function of two quaternions. The client renders the operating model using the final rotation transformation $Q_3$ to implement its rotation. That is, as the slider moves, the operating model rotates in 3D space.

$S_3$=Lerp($S_1, S_1'$, p), where p is the value corresponding to the scale generated by moving the other slider, Lerp is the linear interpolation function of two real numbers. The client renders the operating model using the final scale $S_3$ to implement its scale. That is, as the slider moves, the operating model scales in 3D space.

User operates the operating model by moving slider until the orientation and the size of model is consistent with the target image. The client sends the final rotation transformation $Q_3$ and the final scale transformation $S_3$ to the server after user operation.

Step 707, the server calculate whether the following formula holds, after receives the feedback data from the client:

$$FAbs(Dot(Q_2,Q_3)-1.0)<\varepsilon_2 \text{ and } FAbs(S_3/S_2-1.0)<\lambda_2;$$

Where $\varepsilon_2$ is a predefined target rotation difference threshold value between the final rotation transformation and the target rotation transformation, and the value range is (0, 1). $\varepsilon_2$ can be set according to actual needs. The smaller the value is, the smaller the difference between the final orientation and the target orientation is, and the more difficult the passing of the verification is. The value is set to 0.1 in this embodiment. $\lambda_2$ is a predefined target scale difference threshold value between the final scale transformation and the target scale transformation. $\lambda_2$ can be set according to actual needs. The smaller the value is, the smaller the difference between the final size and the target size is, and the more difficult the passing of the verification is. The value is set to 0.1 in this embodiment. FAbs is an absolute value function. Dot is the dot product function of two quaternions. If the formula is true, return the verification success, otherwise return the verification failure.

In this embodiment, a set of the initial transformations and a set of the initial target transformations both include the rotation transformation and the scale transformation. That is, each set of transformations includes two types of transformations, and the number and type correspond to each other. The random numbers are also a set, and the number of the set of the random numbers also corresponds to the number of the set of the transformations. Therefore, the generated target transformations are also a set, and the number and type also correspond to the initial transformations and the initial target transformations.

The method for realizing the CAPTCHA with 3D models and the device thereof leverage the advantage of perception of 3D space in human beings. So it is easy and rapid to distinguish the computers from humans, and the possibility of cracking by image recognition technology and AI technology is avoided or greatly reduced. The random transformations are used to generate different initial state and target images of the 3D models, and thereby the automatic generation and updating of the CAPTCHA is realized. Therefore the cracking possibility by the computer through the exhaustive traversal method is avoided or greatly reduced, and the costs of manual filtering is effectively reduced; the CAPTCHA is completed by sliding operation instead of keyboard operation, and therefore the possibility of user misoperation is reduced and the interaction efficiency and user experience are improved.

The above-mentioned embodiments are merely illustrative of the preferred embodiments of the present invention, and the description thereof is not to be construed as limiting the scope of the invention. It should be noted that any modifications, equivalents, improvements, etc., made within the spirit and scope of the present invention are intended to be included within the scope of the present invention.

What is claimed is:

1. A method for realizing a CAPTCHA (Completely Automated Public Turing test to tell Computers and Humans Apart) with 3D models comprising:
   randomly selecting a 3D model from a model repository as an original model;
   generating two sets of random transformations, one is a set of initial transformations, and the other is a set of target transformations;
   judging a difference between the set of initial transformations and the set of target transformations, and if the difference between them is within a predefined initial difference threshold value, generating another pair of a set of initial transformations and a set of initial target transformations
   applying the target transformations to the original model to generate a target model;
   generating a target image from rendering the target model;
   applying the initial transformations to the original model to generate an operating model;
   displaying the operating model for user operation in one region of a client, and displaying the target image in another region of the client;
   changing a property of the operating model through user interactive operation until a state of the operating model is consistent with the target image, generating a final transformations from the initial transformations by means of user interactive operation;
   comparing the target transformations with the final transformations, if the differences between them are within a predefined target difference threshold value, return a verification success, otherwise, return a verification failure.

2. The method for realizing the CAPTCHA with 3D models as claimed in claim 1, further characterized in that:
   the model repository comprises various 3D models, and there is a preprocessing step before the randomly selecting the 3D model, the preprocessing step is translating the centric point of all the 3D models to the origin of a world coordinate system and storing the 3D models in the model repository.

3. The method for realizing the CAPTCHA with 3D models as claimed in claim 1, further characterized in that:
   the set of initial transformations and the set of target transformations both contain at least one transformation, both sets of the transformations have the same number of transformations, and each transformation in one set corresponds to one in the other set, and the transformation can be rotation transformation, scale transformation, translation transformation, material transformation or color transformation.

4. The method for realizing the CAPTCHA with 3D models as claimed in claim 1, further characterized in that:
   the generating the two sets of transformations comprises:
   generating a set of initial transformations and a set of initial target transformations;
   generating a random number;
   generating the target transformations from the initial transformations, the initial target transformations and the random number.

5. The method for realizing the CAPTCHA with 3D models as claimed in claim 4, further characterized in that:
   in the generating the set of initial transformations and the set of initial target transformations, if a difference between the initial transformations and the initial target transformations is within a predefined intermediate threshold value, generating another pair of a set of initial transformations and a set of initial target transformations.

6. A device for realizing a CAPTCHA with 3D models, wherein the device comprises:
   a transformation generator module that generates a set of initial transformations and a set of target transformations and judges a difference between the set of initial transformations and the set of target transformations, and if the difference between them is within a predefined initial difference threshold value, generating another pair of a set of initial transformations and a set of initial target transformations;

a rendering module that generates a target model from an original model by applying the target transformations, and then renders the target model to generate a target image;

an interactive rendering module that generates an operating model from the original model by applying the initial transformations, displays the target image and the operating model in a client end computer, implements an interface between a user and a computer and calculates final transformations according to user operation;

a transformations comparison module that compares the final transformations with the target transformations, and if the differences between them are within a predefined target threshold value, return a verification success, otherwise, return a verification failure.

7. The device as claimed in claim 6, further characterized in that: further comprises a model repository that stores the 3D models, and a model initialization module that preprocesses all the 3D models in the model repository.

8. The device as claimed in claim 6, further characterized in that:

the transformations generator module comprises a random number generator module that generates a random number, and a transformations interpolation module that generates the target transformations.

9. The device as claimed in claim 6, further characterized in that:

the transformation generator module, the model rendering module and the transformations comparison module are in a server; the interactive rendering module is deployed in a client.

* * * * *